United States Patent Office 3,333,465
Patented Aug. 1, 1967

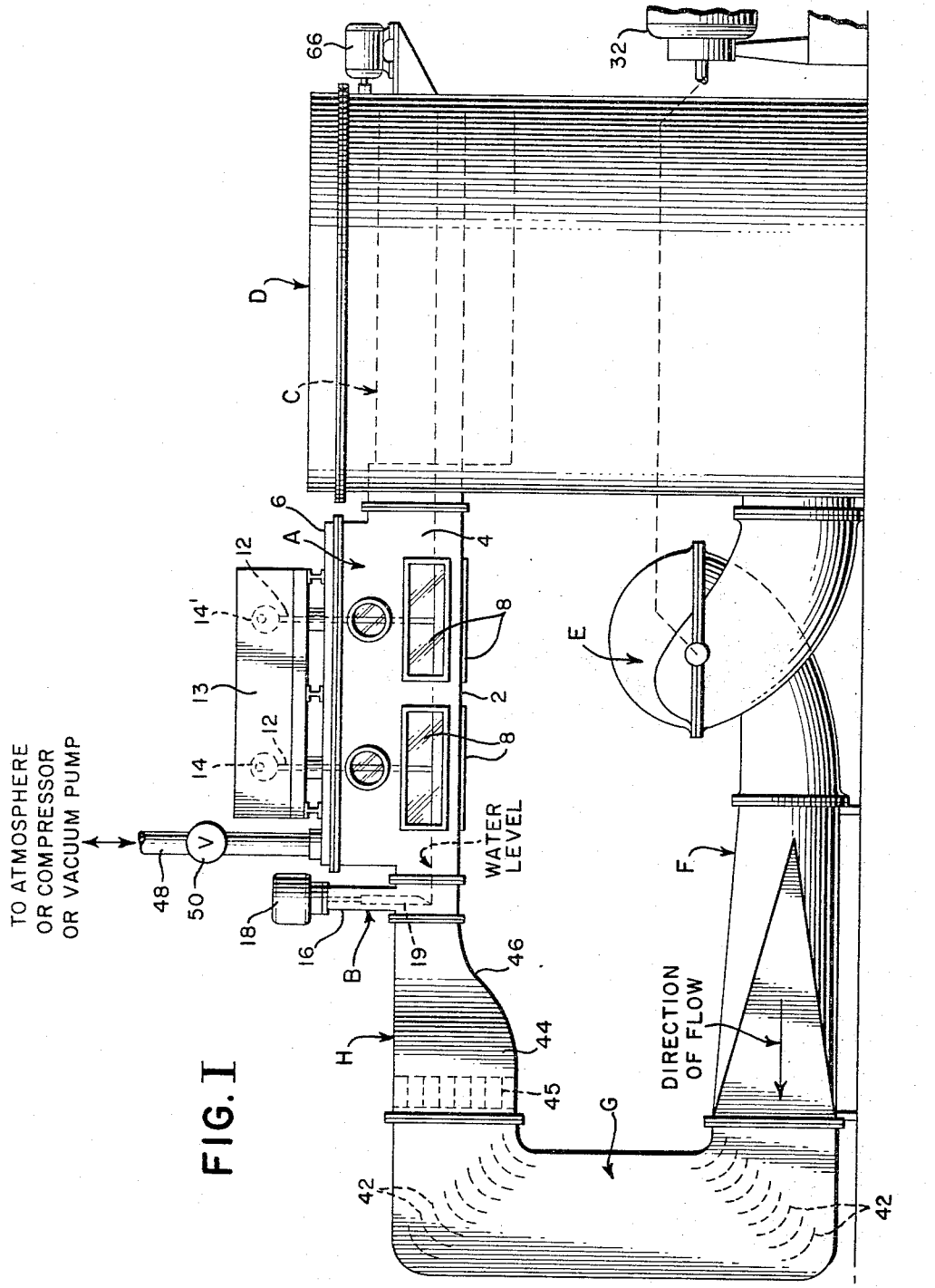

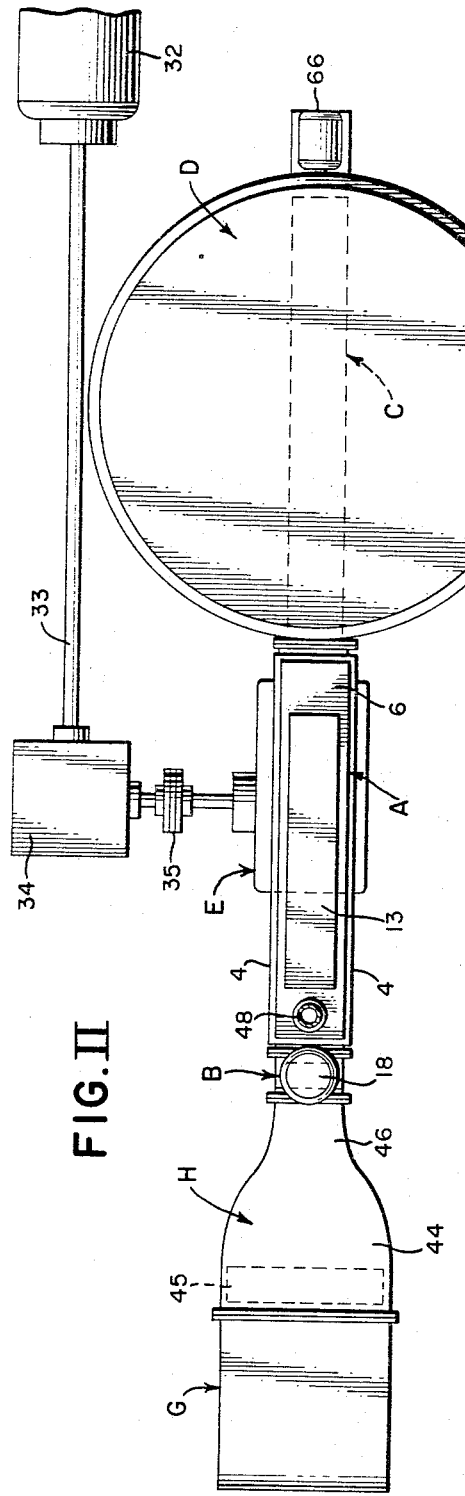
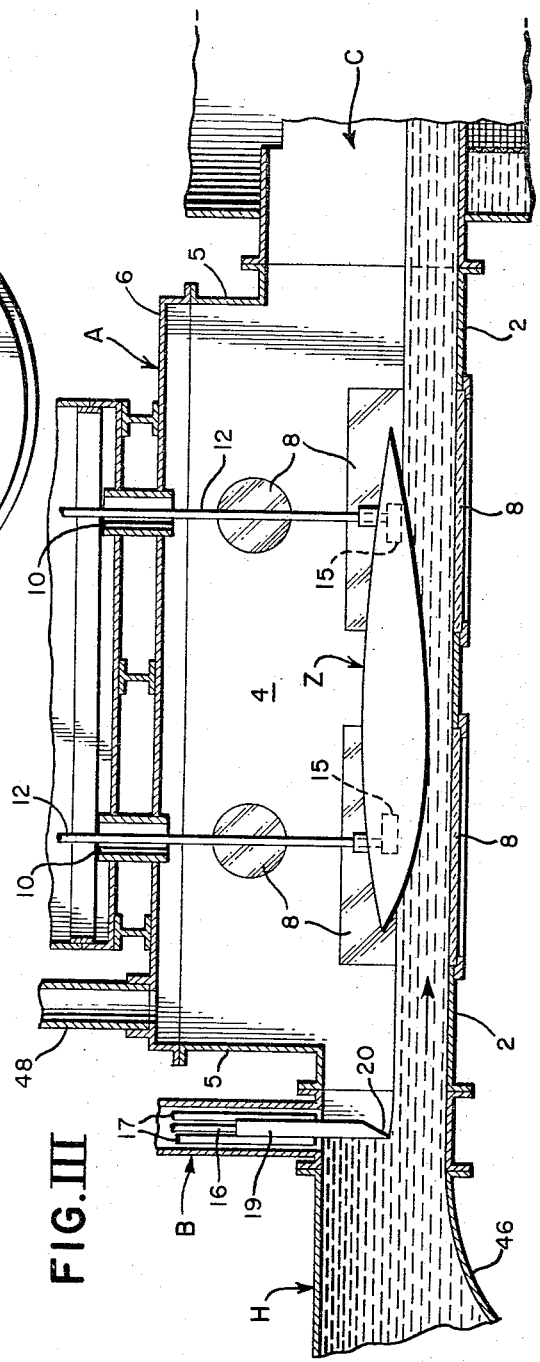

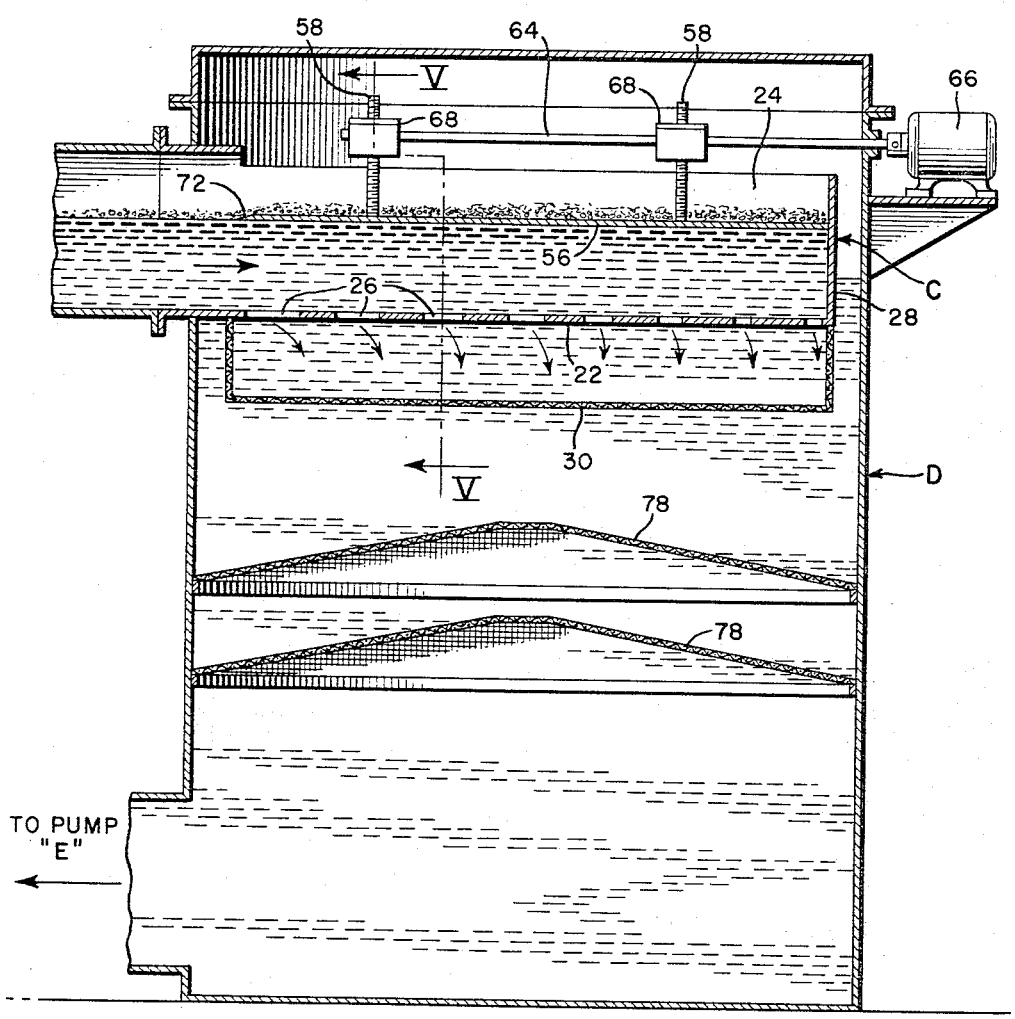

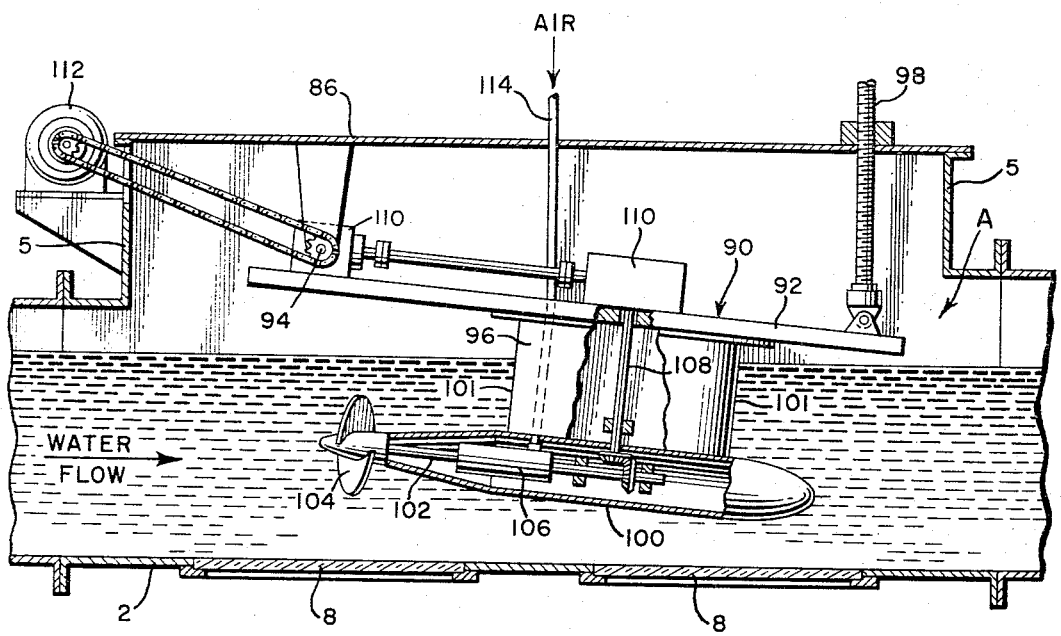
FIG. VI
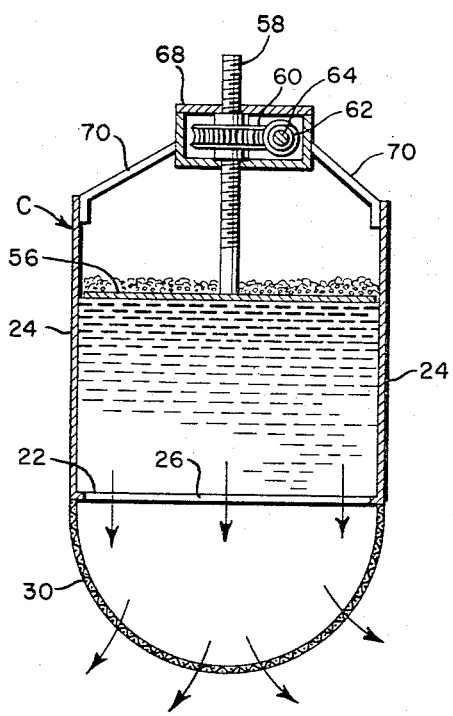
FIG. V
INVENTORS
ALEX GOODMAN,
VIRGIL E. JOHNSON
BY John J Byrne
ATTORNEY

3,333,465
VARIABLE-PRESSURE, VARIABLE-DEPTH, FREE-SURFACE, HIGH-SPEED, CIRCULATING WATER CHANNEL
Alex Goodman and Virgil E. Johnson, Montgomery County, Md., assignors to Hydronautics, Incorporated, Laurel, Md., a corporation of Maryland
Filed Oct. 20, 1964, Ser. No. 405,207
14 Claims. (Cl. 73—148)

The invention disclosed herein relates to a water test facility or system, in the nature of a water channel, for the experimental determination of the hydrodynamic characteristics of scale models of marine or other devices, such as hulls, propellers, hydrofoils, torpedoes, as well as others.

An object of the invention is to provide a variable-pressure, variable-depth, free-surface, high-speed, circulating water channel for testing various hydrodynamic or related models.

A further object of the invention is to provide a water channel which is relatively small and inexpensive, and has considerably greater versatility than other similar test facilities.

Presently available facilities of this nature, such as water tunnels, water channels, and towing tank test facilities are lacking in that the type of testing that may be done with each is limited or requires considerable space and expensive equipment.

The test facility disclosed herein may be used to do all the types of experimental testing heretofore done, but its scope of operations is greatly enlarged. To this end, the facility is constructed to provide a circulating water channel that permits testing at various water depths; testing at low or high velocity water-flow; testing in smoothly flowing free-surface deaerated water; testing with ventilated flow at the test model; testing under pressure either normal or abnormal; testing under simultaneous Froude and cavitation numbers modeling; and furthermore such various testings may be carried out combined or independently of one another.

The test facility in accordance with the preferred form of the invention comprises a circulating water channel in the form of an endless path or loop in which water is circulated by a pump whose discharge-volume can be controlled. In an upper part of the path, a horizontally disposed test section or chamber is provided in which the models are tested; the term, model, being used to embrace any body or device put in the test chamber for testing. The path includes means at the water-entrance to the test chamber for controlling the depth of water-flow in the test chamber, and includes means downstream of the water-outlet end of the test chamber for minimizing water back pressure and for deaerating the flowing water and settling the water down; that is, lowering its velocity considerably. A further feature of the invention resides in the fact that the test chamber has replaceable means; namely, several different top closures, which greatly expand the types of models that can be tested, and the nature of the tests.

Other objects, features, and advantages, particularly in the means disclosed, will become apparent upon a reading of the description with reference to the accompanying illustrative drawings of the preferred embodiment wherein:

FIG. I is a side view of the facility;
FIG. II is a plan view of the facility;
FIG. III is an elevational cross-section at a greater scale of the test chamber of the facility when set up to test a model hull;
FIG. IV is an elevational cross-section through the settling tank of the facility;
FIG. V is a section substantially on the line V—V of FIG. IV; and
FIG. VI is a view to illustrate a test chamber set up for testing a model propeller.

Referring to the drawings (FIG. I) the preferred test facility comprises a vertical circulating water channel arranged in a fixed closed conduit path or loop having generally a horizontally arranged test chamber A, water being admitted therein through a depth-controlling sluice gate-valve B, with water passing from the test chamber into a prolonged co-extensive channel spillway C, the spillway being at the top portion of a deaerator and settling tank D. The channel further includes a pump E which draws water from the lower portion of the tank D, a diffusor F into which the pump discharges, a vertical double right angle bend rectangular main conduit G from the diffusor, and a contraction H at the discharge side of conduit G, the contraction connecting to the sluice valve B. Test devices of various types and kinds can be suitably supported in test chamber A. In the preferred embodiment the described components of the water channel are joined in any common manner in air and/or watertight relationship for reasons hereafter apparent.

More particularly, the test chamber A is an elongated rectangular housing (FIGS. I–III), having a horizontally-disposed bottom 2, opposed vertical side walls 4, transverse upper walls 5. A removable top closure 6 is on the top edges of walls 4 and 5. The bottom and side walls are provided with suitable clear glass or plastic windows 8 for observation purposes. The bottom 2 is horizontal in transverse section but is preferably sloped downwardly downstream in order to avoid effects of boundary build-up. In a specific embodiment, a slope of one inch in twelve feet has been found satisfactory and results in an acceptably horizontal free surface of water in the test chamber A. Consequently, a test model may be held at an even depth in the water along its length during testing.

In the embodiment shown in FIGS. I and III, the closure 6 is formed to provide a model supporting means. This means includes passages 10 and struts 12 which support a model Z on their lower ends. The passages 10 through which the struts pass are packed and sealed in any suitable manner to prevent leakage of air when such is necessary. The struts 12 may be fixed or movable. For example, the struts could be the struts of a planar motion mechanism 13, such as disclosed in U.S. Patent No. 3,052,120 issued Sept. 4, 1964, to Goodman et al.

As described in the patent, the model supporting means comprises a planar motion mechanism 13 having separate controllable eccentric means 14 for reciprocating each strut 12 so that a hull model Z may be held stationary or may be caused to move in a pure heaving motion, or a pure pitching motion or in a combined pitching and heaving motion. Also as described in the patent, the lower ends of the struts 12 are secured to separate gage systems 15 in turn fixed to predetermined points inside the model. When the operations are carried out with the model suitably immersed in relatively moving water, the hydrodynamic characteristics of the model can be ascertained with the use of suitable instrumentation.

The depth of water within the test chamber A is controlled by the sluice valve B which includes a vertical, transverse rectangular sluice gate 16 vertically movable in Teflon guides 17 by any suitable power means such as a reversible motor 18. The sluice gate 16 comprises at its lower end a transverse blade 19 which has a horizontally straight knife edge 20 to provide a smooth free water surface on its downstream side; and the height that the edge is above the bottom 2 of test chamber A determines the depth of the water flowing in the test chamber. In the specific embodiment mentioned, a sluice gate such as B provided test water-depths of up to about two feet.

For uniform or controlled test conditions, it is important at times that the flow of the water through the test chamber A not be significantly impeded or disturbed by back currents, reverse eddy currents, or reflections. To obtain as smooth a water flow as possible through the test chamber, the water leaving the test chamber A flows into the spillway C (FIGS. IV and V) which is an extension of the chamber, having a bottom 22 and opposed vertical side walls 24 as extensions of walls 2 and 4, respectively, of the chamber. The side walls 4 are, however, higher than the side walls 24.

As best seen in FIG. IV, the spillway C is housed within tank D; the latter receiving the water discharged therefrom. The bottom 22 of spillway C is provided with a plurality of transverse openings 26 longitudinal spaced in the direction of water flow, but of equal transverse length which is, preferably, the full inside width of the spillway. As the water enters spillway C it will begin to discharge evenly in successive increments and there is avoided a sudden change in velocity which would react back through the test chamber; and when the water reaches the end wall 28 of the spillway C, its velocity is sufficiently spent to prevent a back pressure or flow.

The openings 26 in the spillway C are arranged such that the water discharges uniformly from the test chamber A into the settling tank D. In the mentioned specific embodiment, a spillway such as C has a bottom width of two feet and a length of 12 feet for a test chamber of corresponding dimensions. In a bottom of this size, 50 openings such as openings 26 were used. These openings were all completely across the bottom of the spillway and were equally spaced slightly less than two inches apart. They were generally narrower downstream, with the widest opening upstream. The following table indicates the width of each opening in the spillway in a downstream direction, the openings being consecutively numbered:

pump E may be driven at different, adjustable speeds by any suitable means such as a variable speed electric motor 32 driving a shaft 33 and gearing 34 which may include a coupling 35.

Referring to FIG. I, the water leaving the transition diffusor F enters and flows through the main conduit G of like area as the rectangular outlet of diffusor F. The conduit G has top and bottom turning elbows with turning vanes 42 to direct the water, substantially dividing the water into parallel streams as it turns, again for the purpose of smooth water-flow.

The water upon leaving conduit G enters contraction H which has a first section or reservoir tank 44 of like area to conduit G in which there is provided honeycomb flow straightening means 45, and has a contraction or water-feed section 46 having a discharge side of like area to the maximum opening of the gate 16 of sluice valve B inlet. The contraction H is kept full of water, and, as is customary with such devices, water entering contraction H enters at a relatively slower velocity and leaves at a greater velocity to enter the test chamber A. Within the design limits of the circulating water channel, any desired velocity of water-flow in test chamber A is obtainable with any desired depth of water in the chamber by suitable adjustment of the vertical position of blade 19 of gate 16, and the output of pump E.

As earlier stated, the system may be placed under various air pressures, and to accomplish this there is provided above the maximum depth of the free water surface, preferably in an upper wall of chamber A or in the top of tank D or both, pipe means 48 having closure valve means 50. The air pipe means can be selectively operably connected to a compressor in the event it is desired to operate the channel at pressures above atmospheric, or the pipe means may be operably connected to a vacuum pump in the event it is desired to operate the channel at pressures below atmospheric, or the pipe means may be left open to atmosphere.

VARIATION OF OPENING SIZE DOWNSTREAM OF TEST SECTION

| Opening | Width Size (In.) | Opening | Width Size (In.) | Opening | Width Size (In.) | Opening | Width Size (In.) |
|---|---|---|---|---|---|---|---|
| 1 | 2.5 | 13 | 0.875 | 25 | 0.875 | 38 | 0.875 |
| 2 | 2.0 | 14 | 0.875 | 26 | 0.875 | 39 | 0.875 |
| 3 | 2.0 | 15 | 0.875 | 27 | 0.875 | 40 | 0.875 |
| 4 | 1.75 | 16 | 0.875 | 28 | 0.875 | 41 | 0.875 |
| 5 | 1.50 | 17 | 0.875 | 29 | 0.875 | 42 | 0.8125 |
| 6 | 1.50 | 18 | 0.875 | 30 | 0.875 | 43 | 0.8125 |
| 7 | 1.375 | 19 | 0.875 | 31 | 0.875 | 44 | 0.8125 |
| 8 | 1.25 | 20 | 0.875 | 32 | 0.875 | 45 | 0.8125 |
| 9 | 1.0 | 21 | 0.875 | 33 | 0.875 | 46 | 0.8125 |
| 10 | 1.0 | 22 | 0.875 | 34 | 0.875 | 47 | 0.8125 |
| 11 | 1.0 | 23 | 0.875 | 35 | 0.875 | 48 | 0.8125 |
| 12 | 1.0 | 24 | 0.875 | 36 | 0.875 | 49 | 0.8125 |
|  |  |  |  | 37 | 0.875 | 50 | 0.8125 |

Because of their number and small size, the openings 26 are only illustratively shown in FIG. IV.

It is apparent that the spillway C is co-extensive with and a prolongation of the test section of chamber A, and the two sections define a single U channel having a bottom and side walls, and with the length of the spillway substantially equal to that of the test section the heretofore described results are achieved.

The water passing through openings 26 is dispersed by a semi-cylindrical screen 30 under them, which breaks the water up into a very large number of very fine streams. The screen 30 tends to force water discharged from the spillway C over the cross-sectional area of the cylindrical tank D; and the emitted fine streams encourage the release of water-carried air.

The water-flow through the test chamber A is forced by the pump E which draws the water from the bottom of tank D and discharges it from the pump's circular outlet into transition diffusor F. As illustrated in FIG. II, Air will usually be entrained in water flowing past a model in the test chamber; and an advantage of the invention is the fact that air entrained in the water flowing to the test chamber A may be reduced to a minimum, so that consistent test results will be assured. As an aid to this end, there is arranged in the spillway section C a skimmer 56 which is a solid horizontally arranged plate of a length and width substantially corresponding to the inside of the spillway. Skimmer 56 is supported by a spaced pair of threaded uprights 58 (FIGS. IV and V) to which is centrally fixed a worm gear 60 operated by a meshing gear 62 secured to shaft 64 operated by a reversible motor 66. The worm gears 60 have hubs rotatably carried in housings 68 held in position by brackets 70 secured to the side walls of the spillway C. Obviously suitable seals are provided for the shafts where they pass through a wall. The skimmer 56 may thus be raised or lowered to correspond to the depth of water flow, the upstream end 72 of the skimmer having a knife edge to raise any water surface froth smoothly above the skimmer as the water flows thereunder.

To further aid in air removal there is positioned beneath the spillway C and screen 30 and above the tank outlet to pump E one or more conical screen baffles 78. In a preferred embodiment screens of 60 mesh were used but any comparable perforated structure may be used. The screens 30 and 78 perform two functions. One is to insure that the downward flow in the settling tank D is more uniform and the other to impede the downward flow of small air bubbles so that they will coalesce into larger air bubbles. The larger air bubbles will rise to the free surface of the water due to their buoyancy. The conical shape of the screens 78 is desirable in order to allow air bubbles which pass through the screens to be accelerated toward the center along the screen and rise to the surface. The bubbles move into the free air space above section A and tank D. The tank D, as best seen in FIG. IV, has an inside diameter slightly greater than the length of the spillway C, but the width of the spillway is substantially less than its length so that there is a large free area between the side of tank D and spillway C through which the air may rise over the free surface of the water which is usually below the top of spillway C. Moreover, the exceptionally large cross-sectional area of the tank D settles or slows down the water-flow velocity, so that the released air bubbles have no difficulty in rising to the surface.

The described deaerating means on the downstream side of a model for removing air from the recirculating water before the water is again passed over the model has proved to be very effective. In the specific embodiment mentioned, having a tank such as tank D with a diameter of about 13 feet and a height of about 18 feet, providing about three feet above maximum test water depth, the deaerating means functioned extremely well for all discharges from the test chamber up to 80 cubic feet per second. At increasing discharges increasing amounts of air in the water were recirculated, but such air did not obscure photography through the windows of the test chamber or influence the results obtained until the discharge exceeded 120 cubic feet per second.

It will be evident to those familiar with testing of devices subject to relative water-flow that the facility described herein can produce conditions unobtainable in other facilities. By way of example, the determination of the cavitation number of a hydrofoil involves the differential between the total water pressure on the hydrofoil and the vapor pressure of water. Herein, by subjecting the model to a high velocity water-flow at subatmospheric pressure, the differential between the total water pressure and vapor pressures may be scaled so that the resultant determined cavitation number substantially reflects the cavitation number under actual operating conditions.

As previously stated, the facility may be operated over a wide pressure range, and in the preferred embodiment a pressure range from two feet of water absolute to atmospheric pressure has been obtained. Also, the facility has the capability of being pressurized to two atmospheres.

It is important to note that the improved water channel permits simultaneous as well as independent control of the water velocity through the test chamber, the absolute pressure in the test chamber, and the depth of water-flow including a free surface relative to the test model in the test chamber. Consequently, a model can be tested under proper scaled conditions of both Froude and cavitation numbers. Previously, this could not be accomplished in a single facility. Furthermore, the large size of tank D allows for the installation of a heat-exchanger for control of water temperature, should such be desired.

In the embodiment described, the removable closure 6 has a model supporting means that comprises a planar motion mechanism, so that the hydrodynamic characteristics of a model can be ascertained. For other kinds of tests and also models, the closure 6 can be replaced with another having a model supporting means suited for the purpose at hand. Usually supporting means for testing models that are relatively stationary with respect to the water channel can obviously be readily provided.

It is pointed out, however, that the water channel described has considerable versatility; and a closure has been provided with a model supporting means for testing propellers including subcavitating, supercavitating, and ventilated types. Usually the propellers are models, but they may be full size for small propellers. Moreover, the propellers can be tested in a submerged or in a broaching condition, and with their driving shafts horizontal or inclined. Such a model supporting means is shown with a closure 86 in FIG. VI.

The propeller supporting means simply shown in FIG. VI for clarity is indicated in its entirety by the reference numeral 90. The supporting means 90 comprises an adjustably tiltable table 92, a shaft or pivot 94 about which the table can pivot, a strut 96 depending from the table, an adjustable tilting device 98 for adjusting the table about its pivot, and a generally streamlined housing 100 carried by the strut. The strut has sharp edges 101 and slightly concave outward sides, and it is hollow inside.

The housing 100 rotatably supports an inner shaft 102 having a protruding upstream end which removably receives any suitable propeller 104 for testing. The propeller driving shaft 102 connects to a measuring and driving means 106, such as a thrust/torque dynamometer, and is driven by a shaft 108 extending from inside the housing upwardly through the inside of the hollow strut 96 to any suitable power transmission system 110 that includes a variable-speed motor means 112, such as for example, a motor eddy current coupling drive. An air-hose 114 may also pass through the strut 96 and into housing 100 for delivering air, through suitable means, to the model for ventilated flow tests.

It is understood that the description given and the facility illustrated is that of the preferred embodiment, and that changes and modifications may be made with the scope of the novelty of the invention claimed.

What is claimed is:
1. In a testing device of the character described
   (a) a U-shaped horizontal water channel having a test chamber section having a water entrance at one end and a horizontal U-shaped spillway section co-extensive with the other end of the test section into which the water flows from the test section;
   (b) means for supplying flowing water to the water entrance of the test section;
   (c) and means for discharging the water from the spillway section comprising a plurality of water-discharge openings therein spaced in the direction of water flow.

2. The device set forth in claim 1 including means at the water entrance to the test section for controlling the depth of water-flow in the section, a water reservoir connected at the water entrance of the U-shaped channel, the reservoir being of substantially greater cross-sectional area at its entrance end than the U-shaped water channel and contracting to the same cross-sectional area of the U-shaped channel at its connection to the entrance end, and said means for controlling the depth of water flow being positioned at the connection, and said means for supplying water to the entrance end of the test section maintaining the reservoir filled with water.

3. In a testing device of the character described
   (a) a U-shaped water channel having test chamber section having a water entrance at one end and a spillway section co-extensive with the other end of the test section;
   (b) means for supplying flowing water to the test section;
   (c) means for discharging the water from the spillway section comprising a plurality of water discharge openings therein spaced in the direction of water flow;

(d) a reservoir and settling tank,
(e) said spillway being positioned within the tank, and
(f) water deaerating means below the spillway for causing release of air entrained in water flowing from said spillway.

4. The device set forth in claim 3 wherein the reservoir and settling tank are of substantially greater cross-sectional area in a horizontal plane than the cross-sectional area of the spillway in the horizontal plane.

5. In a closed loop circulating water channel of the character described
(a) a horizontally arranged water channel having a test section with a water entrance at one end, and a spillway section at the discharge end,
(b) means for discharging the water from the spillway section comprising a plurality of water discharge openings therein spaced in the direction of water flow,
(c) a vertically arranged reservoir and settling tank,
(d) said spillway section emptying adjacent but below the top of said tank,
(e) pumping means having an inlet connected adjacent the lower end of said tank for removing water therefrom, and
(f) conduit means comprising a vertically arranged conduit connected to the discharge end of the pumping means and directing water to the test section water entrance.

6. The device defined in claim 5 wherein said conduit means includes valve means at the test chamber entrance for controlling the depth of water-flow in the test section and limiting the depth of flow to less than the height of the test chamber.

7. The device defined in claim 5 wherein said tank means includes deaerating means between the spillway and the pumping means inlet for deaerating water discharged from the spillway.

8. The device defined in claim 6 including means for controlling the air pressure in said test section and in the tank above the spillway.

9. A channel as defined in claim 7 wherein at least one of said deaerating means is a conical-shaped screen mesh with its apex pointed upstream.

10. A free surface circulating water channel comprising
(a) a pump means for circulating water in said channel,
(b) a test chamber through which water may flow at a relatively high velocity and having means for receiving a model to be tested, and
(c) a settling tank means for receiving water flowing from said test chamber and including means for significantly reducing the flow-velocity of the water without establishing back pressure.

11. The device set forth in claim 10 wherein said last means comprises a spillway co-extensive with the test chamber for initially receiving the water flowing from the test chamber, the spillway being positioned within and across the tank and having a plurality of progressively smaller openings therethrough in the direction of water flow for passage of the water into the settling tank.

12. A circulating water channel as defined in claim 10 including means for controlling the depth and velocity of flow of water through said test chamber.

13. In a testing device of the character described
(a) a U-shaped water channel having a first test chamber section having a water entrance at one end and a second spillway section co-extensive with the other end of the test section;
(b) means for supplying flowing water to the test section entrance end;
(c) means for discharging the water from the spillway section comprising a plurality of water-discharge openings therein spaced in the direction of water flow,
wherein the water discharge openings in the spillway section are of progressively lesser size in the direction of water flow.

14. In a testing device of the character described
(a) a U-shaped water channel having a first test chamber section having a water entrance at one end and a second spillway section co-extensive with the other end of the test section;
(b) means for supplying flowing water to the test section entrance end;
(c) means for discharging the water from the spillway section comprising a plurality of water-discharge openings therein spaced in the direction of water flow,
wherein the test section and the spillway section are of substantially the same length and width.

References Cited
UNITED STATES PATENTS

| | | | |
|---|---|---|---|
| 2,382,999 | 8/1945 | Lee | 73—148 |
| 2,831,345 | 4/1958 | Wolf et al. | 73—148 X |
| 3,017,769 | 1/1962 | Orlin | 73—147 |
| 3,028,688 | 4/1962 | Ebert | 73—148 X |
| 3,052,120 | 9/1962 | Goodman et al. | 73—148 |
| 3,123,455 | 3/1964 | Paasche | 210—523 X |

DAVID SCHONBERG, *Primary Examiner.*